United States Patent [19]

Kingston

[11] 4,407,624

[45] Oct. 4, 1983

[54] WHEELCHAIR LOADING DEVICE FOR PASSENGER CARRYING VEHICLES

[76] Inventor: John C. Kingston, Suite 1210, 261 Cooper St., Ottawa, Ontario, Canada, K2P 0G3

[21] Appl. No.: 290,597

[22] Filed: Aug. 6, 1981

[30] Foreign Application Priority Data

Feb. 23, 1981 [CA] Canada .................................. 371502

[51] Int. Cl.[3] ................................................ B60P 1/48

[52] U.S. Cl. .................................... 414/546; 414/917; 414/921

[58] Field of Search ................ 414/546, 556, 917, 921

[56] References Cited

U.S. PATENT DOCUMENTS 4,273,498 6/1981 Dickhart et al. .................... 414/556

4,325,668 4/1982 Julian et al. ..................... 414/921 X

*Primary Examiner*—Robert G. Sheridan

*Attorney, Agent, or Firm*—Frishauf, Holtz, Goodman & Woodward

[57] ABSTRACT

A horizontal loading platform is pivotally interconnected by a pair of spaced apart and opposed linkage systems, positioned on either side thereof. Each linkage system includes five pivotally interconnected links which are arranged so that a first common link is disposed above the loading platform and the points of pivotal interconnection of a first set of spaced apart links to the common link and to the loading platform define the corners of a first parallelogram. The points of pivotal interconnection of a second set of spaced apart links to said common link and to said framework define the corners of a second parallelogram. Thrust links, which includes an offset arm on the inboard link of said second set of links and a cross-link pivotally connected to said offset arm and to the outboard link of said first set of links, maintain said loading platform out of contact with the vehicle when the loading platform is away from rest position interior of said vehicle. The vehicle includes a raising and lowering mechanism coupled to the linkage system.

10 Claims, 3 Drawing Figures

WHEELCHAIR LOADING DEVICE FOR PASSENGER CARRYING VEHICLES

The present invention generally relates to lifting devices for use on passenger carrying vehicles and more particularly to lifting devices especially suited to loading and detraining passengers using a railway and other handicapped travellers in a safe, convenient and comfortable manner from railway coaches, while maintaining the passenger's confidence and dignity.

BACKGROUND

It is desirable to provide apparatus, including a loading platform which can be lowered from floor level interior of a railway coach to a position on a railway station platform exterior of said railway coach where a wheelchair using passenger can roll his wheelchair from said station platform onto said loading platform and then be raised to an elevation within said coach where he can roll his wheelchair off loading platform further into interior of said coach. Conversely, when said loading platform is at rest position on a floor level interior said coach a wheelchair-using passenger can be rolled onto said loading platform and then be lowered to said station platform where he can, himself roll his wheelchair off loading platform onto the station platform itself.

THE INVENTION

In accordance with one embodiment which is particularly suited for transferring wheelchair-using passengers to and from existing railway coaches there is provided a horizontal loading platform to which is attached a pair of spaced apart and opposed linkage means arranged on either side thereof. These linkage means are employed to pivotally interconnect said loading platform to a framework of a railway coach for movement of said loading platform between station platform exterior said coach and floor level interior said coach. Each of said linkage means includes five pivotally interconnected links whereby a first common link disposed above said loading platform is pivotally connected to said loading platform by a first set of spaced apart links and wherein the points of pivotal interconnection of said first set of links with said common link and said loading platform define the corners of a first parallelogram, and whereby said first common link is further pivotally connected to said framework by a second set of spaced apart links and wherein the points of pivotal interconnection of said second set of links said common link and said framework define the corners of a second parallelogram.

Thrust link means interconnects a link of said first set of links to a link of said second set of links in order to maintain the loading platform out of contact with said vehicle when said loading platform is away from rest position interior of said vehicle. The thrust link means may advantageously comprise an offset arm on the inboard link of said second set of links and a cross-link pivotally connected to said offset arm and to the outboard link of said first set of links. Suitable means cooperating with said linkage means is also employed for raising and lowering the loading platform.

In order to maintain the loading platform horizontal when the coach floor is horizontal during raising and lowering movement and to retain the integrity of the parallelogram configuration the distance between the pivotal connections of the outboard and inboard links to the loading platform and the distance between the pivotal connection of the outboard and inboard links to the framework of the coach are equal and furthermore the distance between the pivotal co-axial connections of the said links to the common link is also equal.

In situations where the railway coach could be caused to lean towards the station platform after the loading platform is firmly down on said station platform, I have found that the framework of the coach may advantageously include a main frame and a sub-frame to which said linkage means is pivotally connected and furthermore said sub-frame includes a machine base to which said prime mover is attached. Said sub-frame is pivotally connected to the main frame of said framework for upward rotation of said sub-frame relative to coach floor level so that said linkage means cannot become over-stressed as a result of coach leaning toward the station platform.

In this configuration outboard and inboard links forming said first set of links in each linkage means are each pivotally connected to the loading platform and further, an outboard link and an inboard link forming said second set of links in each linkage means are each pivotally connected to a sub-frame of the coach. The outboard link in said first set of links and the outboard link in said second set of links are pivotally and co-axially connected to each other and to the outboard end of the common link and an inboard link of said first set of links and the inboard link of said second set of links are pivotally and co-axially connected to each other and to the inboard end of the common link.

Means co-operating with said linkage means for raising and lowering said loading platform can include a prime mover attached to the sub-frame of said railway coach wherein said sub-frame and a main frame constitute a part of the framework of said coach. Means interconnecting said prime mover to at least one link of said second set of links includes worm gear pinion means on a rotatable shaft which is in co-operative driving engagement with worm gear means on said second set of links and wherein said worm gear pinion means and said worm gear means are positioned below the pivotal connection of said second set of links to said sub-frame.

In situations where a power outage could occur at the prime mover, manually engageable drive means may advantageously be included at said rotatable shaft so that the loading platform can be manually brought up to rest position at floor level interior of coach if necessary.

In situations where the floor of the railway coach and the railway station platform are not in parallel planes when the loading platform is deployed a collapsible mechanism in the form of a knee which is pivotally connected to the loading platform and to the inboard link of the second set of links may advantageously be included in the linkage means so that the outboard end of the loading platform will come down to the station platform when the inboard end of said loading platform contacts station platform before the outboard end and further, said knee is provided with a stop pin means which will restrain pivotal displacement of said knee towards outboard link of the first set of links.

As security for the wheelchair using passenger is important from the standpoint of safety, the loading platform may advantageously include a lever for control of pneumatically powered or manually actuated, retractable, wheel engaging means, hereinafter called chocks, preferably controlled by wheelchair occupant for releasably retaining a wheelchair whilst positioned on the loading platform. If required the loading platform may also include a hand rail to which retaining bars may be attached, which can be closed before and behind the wheelchair passenger while being transported on said platform. A translucent section of plate may also be advantageously set in the surface of the loading platform between the chocks and beneath which electric lighting is installed to aid the wheelchair passenger in centering his wheelchair between the chocks.

BRIEF DESCRIPTION OF THE DRAWINGS

In the accompanying drawings which illustrate various embodiments of my invention.

DETAILED DESCRIPTION OF THE DRAWINGS

Figure 1:
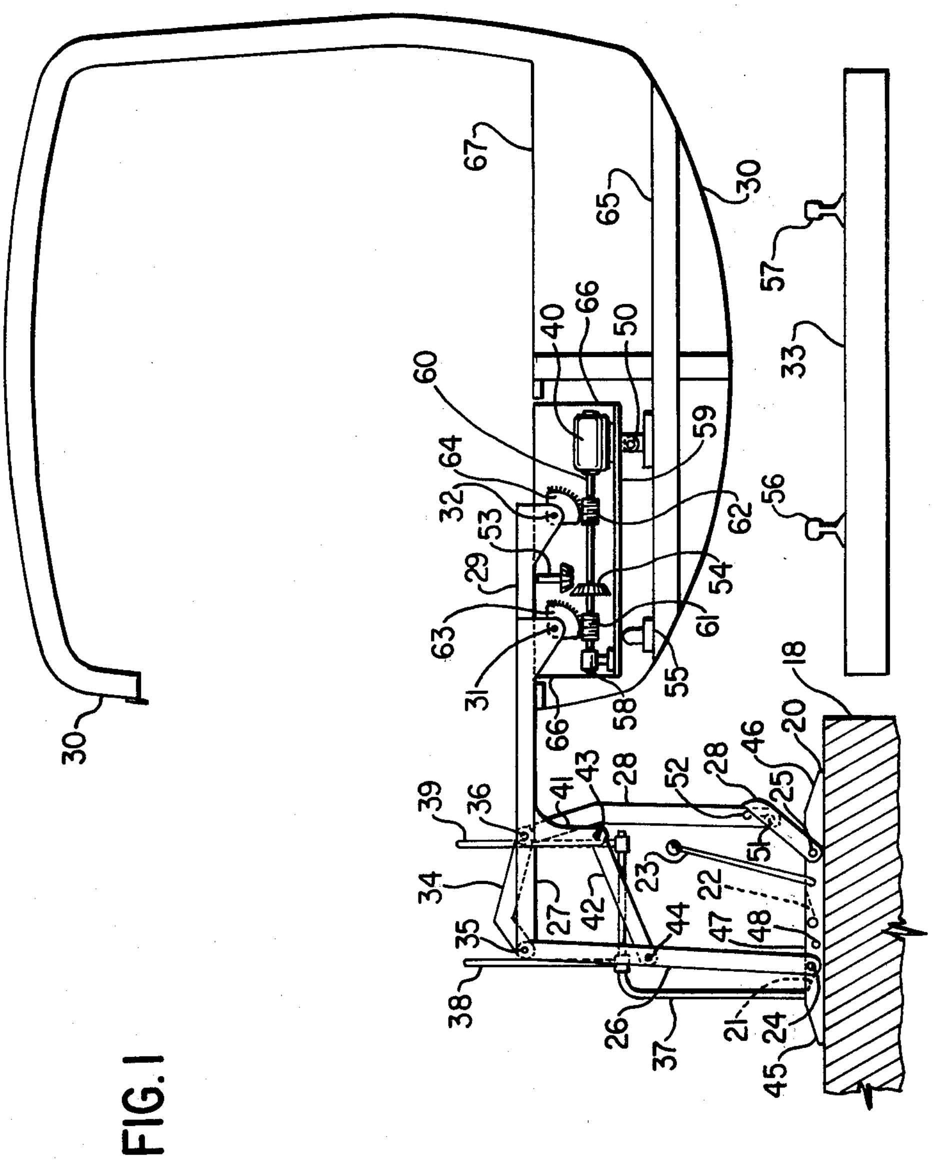
FIG. 1 is a cross section schematic drawing of a railway coach illustrating the loading platform of this invention in its deployed position on a railway station platform.

Referring in detail to the drawings of the present invention, FIG. 1 depicts a loading platform means of transferring a wheelchair using passenger between a railway station platform indicated at 18 and the interior of a railway coach framework indicated at 30 when such coach, the wheels of which are not shown in the drawing, is motionless on railway line indicated by tracks 56 and 57 and railway tie 33. It consists of a loading platform 20 with end ramps 45 and 46, a rear chock 21 and a front chock 22 which are controlled by chock lever 23. A rear shaft 24 and a front shaft 25 pass horizontally through loading platform from side to side.

Link 26 is pivotally attached to shaft 24 and link 28 is pivotally attached to shaft 25.

Link 28 consists of two pieces pivotally connected at 51 so as to form a collapsible knee with stop pin 52 located in upper piece of said link 28 so that said knee cannot be displaced beyond design limits towards link 26.

Shafts 31 and 32 are pivotally connected to sub-frame 66 of main frame 65 of coach framework 30 and link 27 and worm gear 63 are firmly attached to shaft 31 and link 29 and worm gear 64 are firmly attached to shaft 32.

Figure 2:
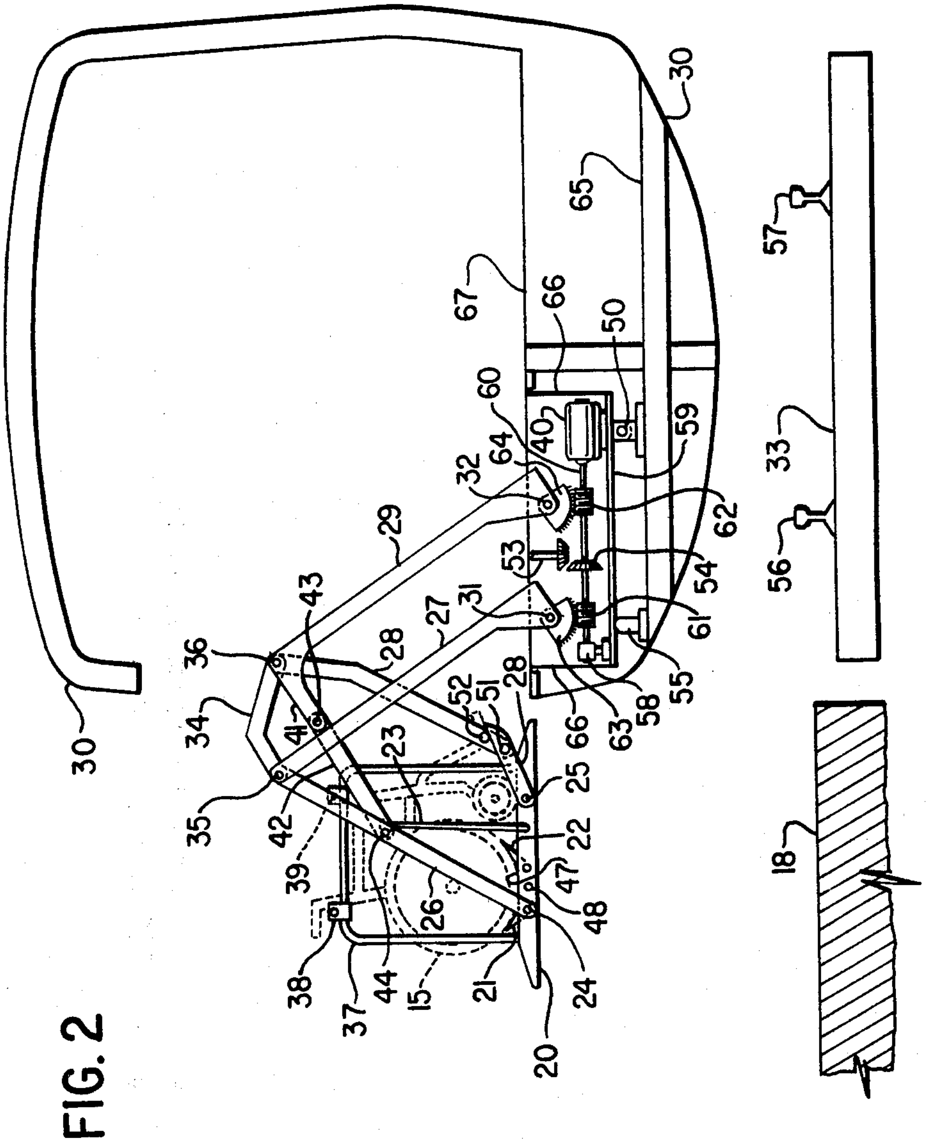
FIG. 2 is a similar view to that of FIG. 1, but wherein the loading platform is in a partially raised position have the railway station platform.

Links 26 and 27 are pivotally and co-axially connected to the outboard end of common link 34 at connection 35 and links 28 and 29 are pivotally and co-axially connected to inboard end of common link 34 at connection 36 (Note FIG. 2).

Offset arm 41 which is a part of link 29 is perpendicular to the longitudinal axis of said link 29. Cross-link indicated at 42 is attached on one end to said offset arm 41 at pivotal connection 43 and the other end of said cross-link 42 is attached to link 26 at pivotal connection 44.

A translucent section of the floor of loading platform 20 situated centrally between the chocks is indicated at 47 and a lighting means beneath said translucent section is indicated at 48.

A handrail indicated at 37 is firmly attached to loading platform 20 and outboard restraining bar 38 and inboard restraining bar 39 are each shown in a vertical position from which they can be rotated about handrail 37 to horizontal position.

Means co-operating with said linkage means for raising and lowering loading platform 20 includes prime mover 40, firmly attached to base plate 59 which itself is firmly attached to sub-frame 66 of main frame 65 of coach framework 30. Said prime mover 40 is connected to rotatable shaft 60, which is supported at its outboard end by outboard bearing 58 which is also firmly attached to base plate 59. Pinion means 61 and 62 are firmly connected to rotatable shaft 60 and are in co-operative driving engagement with worm gears 63 and 64 which are rotatable at pivotal connections 31 and 32. Sub-frame 66 of main frame 65 is pivotally connected to said main frame 65 at 50 and further said sub-frame 66 has free outboard support at chain 55 which itself is firmly attached to main frame 65.

Manually operated means for raising and lowering loading platform 20 in event of power outage at prime mover 40 is indicated at conical gear 54 firmly attached to rotatable shaft 60 and engageable/disengageable conical pinion means with splined shaft indicated at 53.

In FIG. 2 wheelchair indicated at 15 is on loading platform 20, restraining bars 38 and 39 are lowered to horizontal position before and behind said wheelchair and said wheelchair is centered over the illuminated floor section 47 of said loading platform and chocks 21 and 22 are in raised position. Prime mover means 40 in co-operative driving engagement with rotatable shaft 60, worm gear pinion means 61 and 62 and worm gear means 63 and 64 has rotated link 27 about pivot point 31 and link 29 about pivot point 32 so as to raise link 34. Link 26, pivotally attached to link 34 at co-axial connection 35 and link 28 pivotally attached to link 34 at co-axial connection 36 are raised in unison with links 27 and 29 so that loading platform 20, pivotally connected to link 26 at shaft 24, and to link 28 at shaft 25 is raised to elevated position in unison with link 34.

As can be seen from FIG. 2, the link 34 is part of a first parallelogram: 34-26-platform 20-28; and connected to a second parallelogram: 34-27-shaft 60-29. Loading platform 20 is maintained out of contact with the coach and on an essentially vertical path from station platform 18 up to said elevated position by offset arm 41 and cross-link 42, forming a thrust linkage system, or thrust link means.

FIG. 1 shows the thrust linkage angled or folded down;

FIG. 2 the thrust linkage in extended position.

Figure 3:
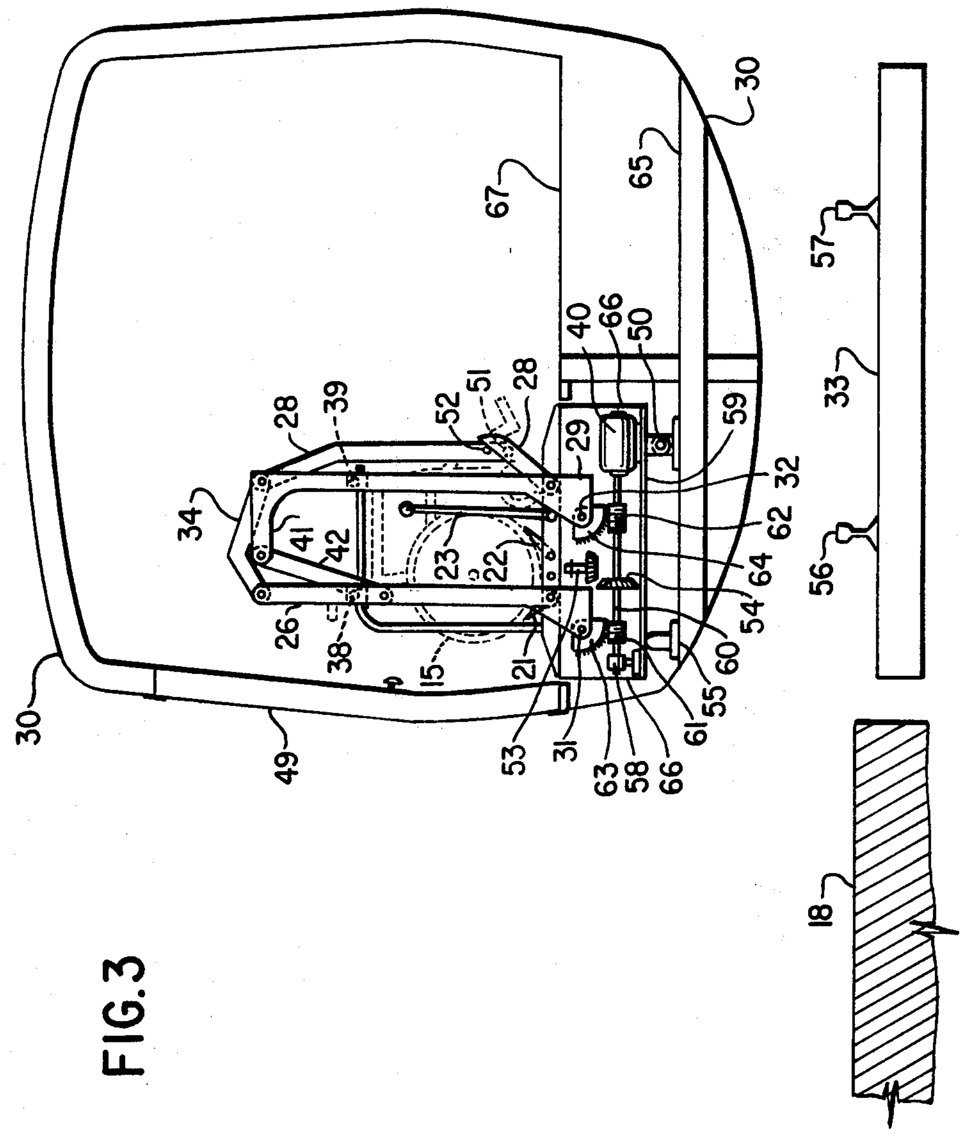
FIG. 3 illustrates the loading platform of FIGS. 1 and 2 when located at rest position internally of the railway coach.

In FIG. 3 prime mover 40 in co-operative driving engagement with rotatable shaft 60, worm gear pinion means 61 and 62 and worm gear means 63 and 64 has further rotated link 27 at pivotal shaft 31 and link 29 at pivotal shaft 32 causing offset arm 41 and cross-link 42 of the thrust linkage to depart from the line indicated in FIG. 2 and close to the folded, angled indicated herein so that platform 20 is maintained out of contact with said coach as it moves on an essentially horizontal path from coach floor level exterior of coach to rest position at floor 67 interior of coach.

Coach door indicated at 49 is closed. When restraining bars 38 and 39 which are shown in horizontal position are raised and chocks 21 and 22 which are shown in up position are lowered wheelchair 15 can be wheeled off loading platform 20 and further into interior of coach.

What I claim as my invention is:

1. A device for raising and lowering wheelchair using passengers to and from a passenger carrying vehicle, said device comprising:

a loading platform for transport of a wheelchair thereon;

a pair of spaced apart and opposed linkage means positioned on either side of said loading platform and which pivotally interconnect said loading platform to a framework of said vehicle for movement of said platform between ground level exterior of said vehicle and floor level interior of said vehicle, each of said linkage means including five pivotally interconnected links wherein a first common link disposed above said loading platform is pivotally connected to said loading platform by a first set of spaced apart links and wherein the points of pivotal interconnection of said first set of links with said common link and said loading platform define the corners of a first parallelogram, and wherein said first common link is pivotally connected to said framework by a second set of spaced apart links and wherein the points of pivotal interconnection of said second set of links with said common link and said framework define the corners of a second parallelogram;

thrust link means interconnecting a link of said first set of links to a link of said second set of links for maintaining said loading platform out of contact with said vehicle when said loading platform is away from rest position interior of said vehicle; and means co-operating with said linkage means for raising and lowering said loading platform.

2. The device as claimed in claim 1, wherein the distance between the pivotal connections of said first set of links with said loading platform is equal to the distance between the pivotal connections of said second set of links with said framework.

3. The device as claimed in claim 2, wherein relative to said vehicle, the pivotal connections of the outboard links of said first and second set of links with said common link are co-axial and the pivotal connections of the inboard links of said first and second set of links with said common link are co-axial.

4. The device as claimed in claim 3, wherein said thrust link means includes an offset arm on the inboard link of said second set of links and a cross-link pivotally connected to said offset arm and the outboard link of said first set of links.

5. The device as claimed in claim 4, wherein said framework of said vehicle includes a main frame and a sub-frame, said linkage means is pivotally connected to said sub-frame and said sub-frame is pivotally connected to said main frame for upward rotation of said sub-frame relative to said floor level.

6. The device as claimed in claim 5, wherein said means co-operating with said linkage means includes a prime mover mounted on said sub-frame and means which interconnects said prime mover to at least one link of said second set of links.

7. The device as claimed in claim 6, wherein said means interconnecting said prime mover to said second set of links comprises worm gear pinion means on a rotatable shaft which is in co-operative driving engagement with worm gear means on said second set of links and wherein said worm gear means and said pinion means are positioned below the pivotal connection of said second set of links with said sub-frame.

8. The device as claimed in claim 7, wherein said rotatable shaft further includes manually engageable drive means for rotating said shaft.

9. The device as claimed in claim 7, wherein each said linkage means further includes a knee link which permits the outboard end of said loading platform to rest on the ground when the ground level is not parallel to the floor level of the vehicle.

10. The device as claimed in claim 9, wherein said knee link is positioned intermediate of and pivotally connected to said loading platform and the inboard link of said first set of links and includes limit means restraining the pivotal displacement of said knee towards the outboard link of said first set of links.

* * * * *